(12) United States Patent
Blanton et al.

(10) Patent No.: US 8,158,140 B2
(45) Date of Patent: Apr. 17, 2012

(54) SILVER POLYAMIDE COMPOSITE

(75) Inventors: Thomas N. Blanton, Rochester, NY (US); David W. Sandford, Rochester, NY (US); Kevin L. Bishop, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 743 days.

(21) Appl. No.: 12/251,365

(22) Filed: Oct. 14, 2008

(65) Prior Publication Data

US 2010/0093851 A1    Apr. 15, 2010

(51) Int. Cl.
*C08K 3/10* (2006.01)
*C08K 5/13* (2006.01)
*C08K 5/105* (2006.01)
*C08K 5/372* (2006.01)

(52) U.S. Cl. ........ 424/405; 424/618; 514/495; 523/122; 524/403; 524/423; 524/538

(58) Field of Classification Search .................. 424/405, 424/618; 523/122; 524/403, 423, 538; 514/495
See application file for complete search history.

(56) References Cited

U.S. PATENT DOCUMENTS

| | | | |
|---|---|---|---|
| 2,823,094 A | 2/1958 | Steiger | |
| 3,282,892 A | 11/1966 | Griebl et al. | |
| 3,904,705 A | 9/1975 | White | |
| 4,298,518 A | 11/1981 | Ohmura et al. | |
| 4,938,955 A | 7/1990 | Niira et al. | |
| 5,405,644 A | 4/1995 | Ohsumi et al. | |
| 6,187,456 B1 | 2/2001 | Lever | |
| 6,468,521 B1 | 10/2002 | Pedersen et al. | |
| 6,585,989 B2 | 7/2003 | Herbst et al. | |
| 6,716,895 B1 | 4/2004 | Terry | |
| 6,726,791 B1 | 4/2004 | Oelund et al. | |
| 7,579,396 B2 * | 8/2009 | Blanton et al. | 524/403 |
| 2005/0183216 A1 | 8/2005 | Harriss et al. | |

FOREIGN PATENT DOCUMENTS

| | | |
|---|---|---|
| EP | 1 190622 A1 | 3/2002 |
| GB | 1140047 | 1/1969 |
| JP | 03-271208 | 12/1991 |
| JP | 04-114038 | 4/1992 |
| JP | 7-233279 | 9/1995 |
| JP | 8-026921 | 1/1996 |
| JP | 28-41115 B2 | 12/1998 |
| WO | WO 2008065110 | 6/2008 |
| WO | WO 2008/094500 A1 | 8/2008 |

OTHER PUBLICATIONS

J.A. Howard; "Autoxidation and Antioxidants, Basic Principles and New Developments"; Rubber Chemistry and Technology; 1974; pp. 988-989.
A. Goetz et al; "The Oligodynamic Effect of Silver"; Silver in Industry; 1940; pp. 401-429.
I.B. Roamns; "Oligodynamic Metals"; Disinfection, Sterilization and Preservation; 1968; pp. 372-400.
Stewart C. Harvey; "Antiseptics and Disinfectants; Fungicides; Ectoparasiticides" The Pharmacological Basis of Therapeutics; pp. 964-987.
Stewart C. Harvey; "Heavy Metals" The Pharmacological Basis of Therapeutics; pp. 924-945.

* cited by examiner

*Primary Examiner* — Ana Woodward
(74) *Attorney, Agent, or Firm* — J. Lanny Tucker

(57) ABSTRACT

A polymer composite comprising a thermoplastic polyamide polymer compounded with an organo-disulfide additive and a silver-based antimicrobial agent is disclosed. The organo-disulfide additive inhibits undesirable discoloration of the thermoplastic polyamide polymer including one or more silver-based antimicrobial agent. Processes for preparing the composite are also disclosed, including compounding the organo-disulfide additive in a polymeric carrier with the silver-based antimicrobial agent, then with the thermoplastic polyamide polymer, or compounding the organo-disulfide additive with the thermoplastic polyamide polymer before adding the silver-based antimicrobial agent.

14 Claims, No Drawings

SILVER POLYAMIDE COMPOSITE

FIELD OF THE INVENTION

The present invention relates to improvements in color of melt-processed thermoplastic polyamide polymer composites including a silver-based antimicrobial agent and plastic objects made of the composites. More particularly, the invention is directed towards use of organo-disulfide additives in such polyamide polymer composites, and an improved method of introducing the organo-disulfide additive and silver-based antimicrobial agent to form a thermoplastic polyamide polymer composite.

BACKGROUND OF THE INVENTION

Widespread attention has been focused in recent years on the consequences of bacterial contamination contracted by food consumption or contact with common surfaces and objects. Some noteworthy examples include the sometimes fatal outcome from food poisoning due to the presence of particular strains of *Eschericia coli* in undercooked beef, *Salmonella* contamination in undercooked and unwashed poultry food products, and illnesses and skin irritations due to *Staphylococcus aureus* and other micro-organisms. Anthrax is an acute infectious disease caused by the spore-forming bacterium *bacillus anthracis*. Allergic reactions to molds and yeasts are a major concern to many consumers and insurance companies alike. Respiratory infections due to viruses such as SARS (severe acute respiratory syndrome) coronavirus, and the return of the H5N1 virus and mutations thereof, now commonly referred to as the avian flu or bird flu, have become major public health issues. In addition, significant fear has arisen in regard to the development of antibiotic-resistant strains of bacteria, such as methicillin-resistant *Staphylococcus aureus* (MRSA) and vancomycin-resistant *Enterococcus* (VRE). The Centers for Disease Control and Prevention estimates that 10% of patients contract additional diseases during their hospital stay and that the total deaths resulting from these nosocomially-contracted illnesses exceeds those suffered from vehicular traffic accidents and homicides. In response to these concerns, manufacturers have begun incorporating antimicrobial agents into materials used to produce objects for commercial, institutional, and residential use.

The antimicrobial properties of silver have been known for several thousand years. The general pharmacological properties of silver are summarized in "Heavy Metals" and "Antiseptics and Disinfectants: Fungicides; Ectoparasiticides," by Stewart C. Harvey in *The Pharmacological Basis of Therapeutics*, Fifth Edition, Louis S. Goodman and Alfred Gilman (editors), published by MacMillan Publishing Company, NY, 1975. It is now understood that the affinity of silver ions for biologically important moieties such as sulfhydryl, amino, imidazole, carboxyl, and phosphate groups are primarily responsible for the antimicrobial and antiseptic activity. A detailed review of the oligodynamic effect of silver can be found in "Oligodynamic Metals" by I. B. Romans in *Disinfection, Sterlization and Preservation*, C. A. Lawrence and S. S. Bloek (editors), published by Lea and Fibiger (1968) and "The Oligodynamic Effect of Silver" by A. Goetz et al. in *Silver in Industry*, Lawrence Addicks (editor), published by Reinhold Publishing Corporation, 1940. These reviews describe results that demonstrate that silver is effective as an antimicrobial agent capable of destroying or inhibiting the growth of microorganisms, including bacteria, yeast, fungi, and algae, and possibly viruses.

While it is well known that silver-based agents provide excellent antimicrobial properties, aesthetic problems due to discoloration of materials incorporating silver-based agents are frequently a concern. This is believed to be due to several root causes, including the inherent thermal and photo-instability of silver ions, along with other mechanisms. A wide range of silver salts are known to be thermally and photolytically unstable, often discoloring to form brown, gray, or black products. Silver ion may be formally reduced to its metallic state, assuming various physical forms and shapes (particles and filaments), often appearing brown, gray, or black in color. Reduced forms of silver that form particles of sizes on the order of the wavelength of visible light may also appear to be pink, orange, yellow, beige, and other colors due to light scattering effects. Alternatively, silver ion may be formally oxidized to silver peroxide ($Ag_2O_2$), a gray-black material, or silver oxide ($Ag_2O$), a brown-black material. In addition, silver ion may simply complex with other materials (e.g. polymer additives, catalyst residues, impurities, surface coatings, etc.) to form colored species without undergoing a formal redox process. Silver ion may attach to various groups on proteins, for example, those present in human skin, resulting in the potentially permanent dark stain condition known as argyria. Silver ion may react with sulfur to form silver sulfide ($Ag_2S$), for which two natural mineral forms, acanthite and argentite, are known, and are black in color. Silver ion may complex with phosphate ion to form $Ag_3PO_4$, a yellow material; with chromate ion to form $Ag_2CrO_4$, a dark red material; with dichromate ion to form $Ag_2Cr_2O_7$, also a dark red material; with periodate ion to form $AgIO_4$, an orange-yellow material; or with permanganate ion to form $AgMnO_4$, a dark violet material. While pure silver sulfate is colorless, it has been observed to decompose by exposure to light to a violet color.

In any given situation, a number of mechanisms or root causes may be at work in generating aesthetically displeasing silver-based discoloration, complicating the task of providing a solution to the problem. For example, Coloplast, in U.S. Pat. No. 6,468,521 and U.S. Pat. No. 6,726,791, discloses the development of a stabilized wound dressing having antibacterial, antiviral, and/or antifungal activity characterized in that it comprises silver complexed with a specific amine and is associated with one or more hydrophilic polymers, such that it is stable during radiation sterilization and retains the activity without giving rise to darkening or discoloration of the dressing during storage. Registered as CONTREET®, the dressing product comprises a silver compound complexed specifically with either ethylamine or tri-hydroxymethyl-aminomethane. These specific silver compounds, when used in conjunction with the specific polymer binders carboxymethylcellulose or porcine collagen, are said to have improved resistance to discoloration when exposed to heat, light, or radiation sterilization and contact with skin or tissue.

While the point in time when discoloration of a polymer composite including a silver-based agent appears may range from early in the manufacturing process to late in the useful life of a finished article, we have observed that extreme discoloration is present immediately following melt-processing of a polyamide composite comprising a silver-based agent. While hydrocarbon-based polymeric materials are well known to inherently discolor to some small degree either during high temperature melt processing, or later due to aging in the presence of light, oxygen, and heat, we have observed about a 100-150 fold relative increase in discoloration when a polyamide is melt-processed along with even a modest amount (0.5 weight percent) of a silver-based agent.

Linear aliphatic polyamides, such as nylon 6 or nylon 6,6 polymers, are typically melt-processed at temperatures between about 220-300° C., while partially or wholly aromatic polyamides are typically melt-processed at higher temperatures between about 300-450° C. Relatively small amounts of conventional thermal yellowing of hydrocarbon-based polymers are well understood to occur under these conditions by an oxidative chain reaction process that is initiated by free-radical formation due to the relative weakness of the carbon-hydrogen bond. Free radicals (R*) formed along the hydrocarbon polymer backbone or at terminal positions or on substituents groups resulting from thermally induced homolytic breakage of the carbon-hydrogen bond subsequently react with oxygen ($O_2$) to form peroxy radicals (ROO*), which in turn can react with the polymer to form hydroperoxides (ROOH) and another free radical (R*). The hydroperoxide can then split into two new free radicals, (RO*) and (*OH), which will continue to propagate the reaction at hydrocarbon portions of other polymer chains. It is well known in the art that additives such as antioxidants and light stabilizers can prevent or at least reduce the effects of these oxidative chain reactions. Several types of additives can be added to hydrocarbon-based polymers during processing. Additives are generally divided into groups: stabilizers and modifiers. Typical modifiers include but are not limited to antistatic and antifogging agents, acid scavengers, blowing agents, cling agents, lubricants and resins, nucleating agents, slip- and anti-blocking agents, fillers, flame retardants, compatibilizers, and crosslinkers. Antioxidant stabilizers are typically classified as (1) free-radical scavengers or primary antioxidants, and (2) hydroperoxide decomposers or secondary antioxidants, and serve to counter undesirable consequences (e.g. embrittlement and discoloration) resulting from the thermal instability of the carbon-hydrogen bond. The use of hindered phenols and aromatic amines as antioxidants in hydrocarbon-based polymers is well known in the art.

Approaches in the art to improve the thermal stability of polyamides melt-processed in the absence of a silver-based additive are varied and numerous. French Patent 906,893 and British Pat. 652,947 disclose stabilization of synthetic linear polyamides by the use of copper compounds, while East German Patent 5,350 discloses the use of halogenides, and U.S. Pat. No. 2,510,777 discloses the use of certain acids of phosphorous for this purpose. Mixtures of the above named substances are disclosed in many references, including, for example, in British Patent 722,724 and U.S. Pat. No. 2,705,227; the latter describing a polyamide stabilizer system consisting of a copper compound, a halogen compound, and, optionally, a phosphoric acid or an alkali metal phosphate. While the primary focus of many of these and other references is reduced embrittlement, some also report reduced discoloration. Specifically, British Patent Application 1,140,047 describes a ternary stabilizer system consisting of a copper salt, phosphorous or hypophosphorous acid or a compound of these acids, and an alkali metal halide, which provides molded polyamide compositions with a pale color. Similarly, German Application 2,107,406 discloses a ternary stabilizer system consisting of copper stearate, potassium iodide, and manganese hypophosphite, producing molded polyamide compositions described as colorless. U.S. Pat. No. 2,823,094 discloses that textile materials comprising nylon have a reduced tendency to discolor upon aging or heating when further comprising a compound selected from the group consisting of urea, biuret, dicyandiamide, or ammonium cyanate. U.S. Pat. No. 4,298,518 discloses a polyamide resin composition having excellent appearance and flame-proofing characteristics comprising melamine cyanurate with or without a copper compound, an alkali metal halide, a tin compound, a bisamide compound or a bisureido compound.

Alternatively, many other organic and inorganic compounds have been used for stabilization purposes. It has been suggested to incorporate organic heat stabilizers into the polyamide molecules, for example, amines (Dutch Patent 56,665), mercaptobenzimidazole (U.S. Pat. No. 2,630,421), and n.n-polymethylene-bis-o-hydroxybenzamide (Dutch Patent 55,934). U.S. Pat. No. 5,466,761 discloses nylon alloys with reduced melt-process related yellowing, wherein nylon 4,6 (polytetramethylene adipamide) is mixed with another nylon (e.g. nylon 6 or nylon 6,6) and a nylon copolymer. U.S. Pat. No. 3,282,892 discloses a ternary stabilizer system for polyamides comprising a divalent iron compound, an alkali iodide, and an alkali or earth-alkali phosphate or an organic phosphate having a boiling point above 200° C. U.S. Pat. No. 3,904,705 discloses polyamides stabilized by the incorporation of a mixture of a sterically hindered phenol, a reducing phosphorus compound and a sulphur-containing compound selected from a thiophosphate, a thiodipropionate and a thiocarbamate.

Cairns describes in U.S. Pat. No. 2,430,859 a cross-linked polyamide containing disulfide bonds, prepared through an N-mercaptomethyl polyamide intermediate. This approach to synthesizing a high molecular weight polyamide is extended by Bruck in U.S. Pat. No. 3,299,009 and U.S. Pat. No. 3,331,656, which disclose, in part, a process of asymmetrically and incompletely cross-linking filamentary nylon, said nylon having at least 20% by volume of crystallites, wherein the cross-links comprise disulfide bonds. U.S. Pat. Appl. 20050112339A1 discloses a method for providing antimicrobial protection to plastic structures, such as plastic decking, planking, fencing, and panels, comprising a process of applying a water-soluble biocide (e.g. pyrithione disulfide) to the metal-containing structure, and converting the soluble biocide to a water-insoluble metal biocide salt that is adsorbed on the surface of, or into the porous structure of, the plastic material, to provide slow release of the insoluble antimicrobial agent from the surface or from within the pores of said plastic structure.

U.S. Pat. No. 6,479,144 discloses that spandex fibers prepared by a melt extrusion process to which particles of a silver-based antimicrobial agent (e.g. silver zirconium phosphate, silver glass or silver zeolite) were added along with a standard spandex lubricant (KELMAR® 660), imparted the spandex fibers with excellent anti-tack properties. Uniform distribution as well as a number of non-uniform distributions of the silver-based antimicrobial agent in a sheath/core structured spandex fiber are disclosed.

Extreme discoloration is known to occur in melt-processed thermoplastic polyamides containing a silver-based antimicrobial agent immediately following high temperature compounding, extrusion, or molding. This is described, for example, in US Pat. Appl. 20050183216, which discloses directly incorporating into the melt-processed polyamide (e.g. nylon 6, nylon 6,6, or mixtures thereof) a conventional optical brightener in an amount of about 0.005 to 0.2 percent by weight of the composition, and optionally an antioxidant (e.g. a conventional hindered phenol in combination with an organic phosphite), along with the silver-based antimicrobial agent. The exemplified silver-based antimicrobial agent is a silver-glass, IONPURE™, obtained from the Ishizuka Glass Company. WO2008065110 discloses the addition of ultraviolet light absorbers, or blue light absorbing dyes such as pinacryptol yellow, to textile fibers to act as optical filters to reduce undesired coloring resulting from the photoreduction of a silver-based antimicrobial agent contained therein.

In addition to the color instabilities inherent to silver and silver-based antimicrobial agents, and, to a lesser extent, to the hydrocarbon-based polymeric materials themselves, silver-based agents imbedded in a polymer composite may react with polymer decomposition products, modifiers, stabilizers, and residual addenda (e.g. catalysts) to form potentially colored byproducts. This greater complexity of potential chemical interactions further challenges the modern worker in designing an effective stabilizer for polymers containing silver-based agents.

A number of approaches have been taken in the past to reduce discoloration resulting from the inclusion of silver-based agents in melt-processed polymers. Niira et al in U.S. Pat. No. 4,938,955 disclose melt-processed antimicrobial resin compositions comprising a silver containing zeolite and a single stabilizer (discoloration inhibiting agent) selected from the group consisting of a hindered amine (CHIMASSORB 944LD or TINUVIN 622LD), a benzotriazole, a hydrazine, or a hindered phenol (specifically octadecyl 3-(3, 5-di-tert-butyl-4-hydroxyphenyl)propionate, commercially available as IRGANOX 1076). Reduction in long-term discoloration from exposure to 60 days of sunlight in the air was the only response reported.

Ohsumi et al. in U.S. Pat. No. 5,405,644 disclose two fiber treatment processes in which the addition of a benzotriazole, preferably methylbenzotriazole, to treatment solutions inhibits discoloration in treated fibers comprising a silver-containing tetravalent-metal phosphate antimicrobial agent. More specifically, addition of a benzotriazole to an ester spinning oil was disclosed to reduce discoloration in treated fibers following one day exposure to outdoor sunlight, and the addition of a benzotriazole to an alkali treatment solution reduced discoloration in treated fibers when examined immediately following treatment. Ohsumi et al. hypothesizes that the benzotriazole either retards the dissolution of silver ions or inhibits the reaction of small amounts of soluble silver ion with the various chemicals present in the fiber treatment solutions.

Lever in U.S. Pat. No. 6,187,456 demonstrates reduced thermal yellowing of melt-processed polyolefins, specifically polyamides, containing silver-based antimicrobial agents silver zirconium phosphate or silver zeolite when sodium stearate is replaced with aluminum magnesium hydrotalcite. Tomioka et al. in JP08026921 disclose that discoloration from high temperature can be prevented for polypropylene compounded with a silver-based antimicrobial agent containing specific amounts of sulfite and thiosulfate ion, if the silver-based antimicrobial agent is impregnated on a silica gel support. Dispersing silver-based antimicrobial agents into a wax or low molecular weight polymer as a carrier that is blended into a higher molecular weight polymer is disclosed in JP03271208A and JP28411115B2 as a safe means to handle higher concentrations of silver-based antimicrobial agents without staining the skin.

Reducing discoloration by combining silver-based antimicrobial agents with other antimicrobial agents to reduce the total amount of silver in a given formulation is also known. Ota et al in JP04114038 combine silver sulfate with the organic antifungal agent TBZ (2-(4-thiazolyl)benzimidazole) to reduce discoloration in injection molded polypropylene. Herbst in U.S. Pat. No. 6,585,989 combines a silver containing zeolite and the organic antimicrobial agent TRICLOSAN® (2,4,4'-trichloro-2'-hydroxydiphenyl ether) in polyethylene and polypropylene to yield improved UV stabilization (less yellowness) in accelerated weathering tests.

There is a great need to provide improved melt-processed polyamide composites comprising silver-based antimicrobial agents wherein the degree of aesthetically displeasing discoloration due to the introduction of one or more silver-based antimicrobial agent into the composite or resultant article is substantially reduced.

SUMMARY OF THE INVENTION

In accordance with one embodiment, the present invention is directed towards a polymer composite comprising a thermoplastic polyamide compounded with an organo-disulfide additive and a silver-based antimicrobial agent. The organo-disulfide additive inhibits undesirable discoloration of the thermoplastic polyamide polymer when compounded with one or more silver-based antimicrobial agent. A process of preparing such a composite includes compounding the organo-disulfide additive with the thermoplastic polyamide polymer prior to adding the silver-based antimicrobial agent, or compounding the organo-disulfide additive in a polymeric carrier with the silver-based antimicrobial agent before adding the thermoplastic polyamide polymer.

DESCRIPTION OF THE INVENTION

The object of the present invention is to provide improvements in the color of melt-processed polyamide polymers including a silver-based antimicrobial agent, and plastic objects made therefrom. In accordance with the invention, an organo-disulfide additive is employed to minimize discoloration of thermoplastic polyamide polymers due to compounding of silver-based antimicrobial agents therein. When such an organo-disulfide stabilizer is used along with a silver-based antimicrobial agent within a melt-processed polyamide polymer composite, a surprisingly large reduction in unwanted aesthetically displeasing discoloration is provided.

Silver-based antimicrobial agents suitable for use in the invention are varied and may be classified as metallic silver, salts of silver ion, silver ion carriers or silver ion-exchange compounds, and silver containing glasses. Metallic silver is available in a number of physical forms, including coatings, microscopic filaments, and particles of various shapes and sizes. Silver ion salts may be classified according to their aqueous solubility as highly, moderately, or sparingly soluble. Examples of highly soluble silver salts include, but are not limited to silver nitrate, silver acetate, silver citrate, silver chlorate, silver fluoride, silver perchlorate, and silver propionate. Examples of moderately soluble silver ion salts include but are not limited to silver benzotriazole, silver borate, silver carbonate, silver lactate, and silver sulfate. Examples of sparingly soluble silver ion salts include but are not limited to silver chloride, silver bromide, silver silver iodide, silver behenate, silver oxide and silver peroxide. Examples of silver ion carriers include various forms of silver containing zeolite and silver deposited onto calcium phosphate, calcium silicate, or silica gel. Silver ion-exchange compounds can include silver zirconium phosphate type layered materials. Silver glasses include but are not limited to silicate, aluminosilicate, and aluminozirconosilicate hosts that contain silver, for example, IONPURE™ (Ishizuka Glass Company). The choice of a silver-based antimicrobial agent is dependent on many factors including the particular polymer host and the end use of the composite. In certain embodiments, the silver-based antimicrobial agent can be silver sulfate.

Silver sulfate for use in polymer composites of the present invention may be obtained from various commercially available sources (e.g., Riverside Chemical, Aldrich Chemical), and may be produced by conventional aqueous precipitation methods. The reaction of equimolar amounts of aqueous solutions of silver nitrate and sulfuric acid to form silver sulfate was described by Th. W. Richards and G. Jones, *Z. anorg Allg. Chem.* 55, 72 (1907). A similar precipitation process using sodium sulfate as the source of sulfate ion was reported by O. Honigschmid and R. Sachtleben, *Z. anorg. Allg. Chem.* 195, 207 (1931). An alternate method employing the immersion of silver metal in a sulfuric acid solution was also reported by O. Honigschmid and R. Sachtleben (loc. cit.). Precipitation of finely divided silver sulfate from an aqueous solution via the addition of alcohol was later reported by H. Hahn and E. Gilbert, *Z. anorg. Allg. Chem.* 258, 91 (1949).

Silver sulfate may be obtained by a process wherein an aqueous solution of a soluble silver salt and an aqueous solution of a source of inorganic sulfate ion are added together under turbulent mixing conditions in a precipitation reactor. Suitable soluble silver salts include but are not limited to silver nitrate, silver acetate, silver propionate, silver chlorate, silver perchlorate, silver fluoride, and silver lactate. Suitable Inorganic sulfate ion sources include but are not limited to sulfuric acid, ammonium sulfate, alkali metal (lithium, sodium, potassium, rubidium, cesium) sulfate, alkaline earth metal (such as magnesium) sulfate, and transition metal (such as zinc, cadmium, zirconium, yttrium, copper, nickel, iron) sulfate. The soluble silver salt can be silver nitrate and the source of inorganic sulfate ion can be ammonium sulfate or sulfuric acid in certain embodiments.

Once formed in an aqueous precipitation process, the resulting silver sulfate particles may be washed, dried and collected as a white free-flowing powder. The precipitation process can result in producing both a small primary crystallite size and a small grain size, along with a narrow grain size distribution. Average particle sizes of less than 100 micrometers, and even less than 50 micrometers, may be desired for particular product applications, however, larger or smaller particle sizes can be used. Means of controlling the particle size of precipitated silver sulfate via specific additives in the precipitation reactor are disclosed in U.S. Pat. No. 7,261,867; U.S. Pat. No. 7,931,880; U.S. Pat. No. 7,655,212; and U.S. Publication 2009/0258218 filed Apr. 11, 2008. Silver sulfate can be used as made by a commercial precipitation processes or by the precipitation processes described herein, or, alternatively, can be reduced in particle size using a mortar and pestle, ball mill, jet mill, attrition mill, and other techniques used for particle size reduction of solid particles.

The weight ratio of the silver-based antimicrobial agent to thermoplastic polyamide polymer in the composite may vary widely depending on the specific silver-based antimicrobial agent chosen and the end-use application. The ratio can be at least 0.01:99.99, more preferably at least 0.05:99.95. Preferably, the composite includes 10 wt % or less of silver-based antimicrobial agent, for example, silver sulfate. At a minimum, a sufficient amount of silver-based antimicrobial agent to impart antimicrobial efficacy by reducing or retarding antimicrobial activity in an amount of at least 5%, preferably at least 10%, is desired. The silver-based antimicrobial agent can be present in an amount of at least 0.01 wt % of the polymer composite.

Organo-disulfide additives useful in the invention can include but are not limited to diaryl, dialkyl, or mixed alkylaryl disulfides. Specific examples include diphenyl disulfide and dioctadecyl disulfide (also named distearyl disulfide). Combinations of organo-disulfide additives may be used.

The weight ratio of the organo-disulfide additive to the thermoplastic polyamide polymer in the composite may vary widely depending on the type and amount of silver-based antimicrobial agent present, the particular polyamide, the melt-processing conditions employed, and the end-use of the polymer composite. Organo-disulfide additives can be used to reduce discoloration in amounts as low as 0.05 weight percent of the entire polymer composite, although lower amounts, such as between about 0.01-0.03 weight percent, or still lower amounts, are believed to be effective under certain circumstances. Addition of some organo-disulfide additives to certain polyamides can cause slight yellowing, suggesting that addition of an excess of organo-disulfide additive beyond the amount required to inhibit the discoloration due to the presence of the silver-based antimicrobial agent is undesired as it may cause additional discoloration.

Thermoplastic polyamide polymers suitable to the invention include those melt-processed between about 220-500° C. Examples of such polymeric materials include: polyamides and polypeptides, including, for example, the commercially available commodity nylons such as nylon 6 (polycaprolactam); nylon 6,6 [poly(hexamethylene adipamide)]; blends of nylon 6 and nylon 6,6; commercial specialty nylons such as nylon 7 [poly(7-heptanamide)], nylon 8 [polycapryllactam], nylon 9 [poly(9-nonanamide)], nylon 11 [poly(11-undecanamide)], nylon 12 [polylauryllactam], nylon 4,6 [poly(tetramethylene adipamide)], nylon 6,9 [poly(hexamethylene azelamide)], nylon 6,10 [poly(hexamethylene sebacamide)], and nylon 6,12 [poly(hexamethylene dodecanediamide)]; commercially available polymers poly(methylene-4,4'-dicyclohexylene dodecanediamide), poly(1,4-cyclohexylenedimethylene suberamide), poly(m-phenylene isophthalamide) (DuPont NOMEX™), poly(p-phenylene terephthalamide) (DuPont KEVLAR™), poly(2,4,4-trimethylhexamethylene terephthalamide), and poly(2,2,4-trimethylhexamethylene terephthalamide); other nylons such as nylon 1 and derivatives thereof, nylon 3 (poly-β-alanine), nylon 4, nylon 5; branched nylons; wholly aromatic polyamides; aliphatic-aromatic polyamides; polyureas; polyurethane fibers, such as those used in "hard" segments of elastomeric AB block copolymers (DuPont Spandex technology), in reaction injection molding (RIM) systems for making automobile parts (e.g. bumpers), and in rigid and flexible foams (such as HYPOL™ available from W. R. Grace & Co. (USA)); polyhydrazides; polyimides, such as poly(4,4'-oxydiphenylene-pyromellitimide) (DuPont KAPTON™); polyaspartimide; polyimidesulfones; polysulfonamides; polyphosphonamides; and proteins, such as wool, silk, collagen, recombinant human collagen, gelatin, and regenerated protein.

Thermoplastic polyamide polymers for use in the invention can include those generically known as "Spandex" or elastane, preferably comprised of at least 85% by weight of segmented polyurethane, and are commercially available under various brand name trademarks, including LYCRA™, ELASPAN™, DORLASTAN™, and LINEL™. Spandex fibers can be manufactured by four different methods including melt extrusion, reaction spinning, solution wet spinning, and solution dry spinning, the latter being used to produce over 90% of the world's supply of spandex fiber. These methods of spandex polymer preparation are well known in the art and are disclosed, for example, in U.S. Pat. No. 2,929,804; U.S. Pat. No. 3,097,192; U.S. Pat. No. 3,428,711; U.S. Pat. No. 3,533,290 and U.S. Pat. No. 3,555,115. Spandex fibers may be woven with other fibers such as cotton, nylon, or polyester to produce the fabric, for example, used in clothing manufacture.

Homopolymers, copolymers and blends of thermoplastic polyamides described above may be used and may have any stereostructure, including syndiotactic, isotactic, hemi-isotactic or atactic. Stereoblock polymers are also included. The polymers may be amorphous, crystalline, semicrystalline, or mixtures thereof and can possess a range of melt index, for example, from about 0.05 to about 1400. The polymers can posses a range of intrinsic viscosity, for example, from about 0.05 to about 99. The thermoplastic polyamide polymers may be further derivatized or functionalized (e.g. chlorinated, brominated, fluorinated, sulfonated, chlorosulfonated, saponified, hydroborated, epoxidated) to impart other features, such as but not limited to, physical/chemical properties or end-group conversion, or in preparation for subsequent crosslinking, or block or graft copolymerization.

Polyamides for use in the invention can be manufactured by any known method, including, for example, solution polymerization, interfacial polymerization in which an acid chloride and a diamine are used as raw materials, by melt polymerization, solid-phase polymerization, or melt extrusion polymerization in which a dicarboxylic acid and a diamine are used as raw materials.

Besides a polyamide, silver-based antimicrobial agent and an organo-disulfide additive, the polymer composite can include any optional addenda known for use in polymer composites. These addenda can include, but are not limited to, nucleating agents; fillers (including fibrous reinforcing fillers such as glass or graphite fibers, and granular reinforcing filler such as carbon black); intercalates; compatibilizers; coupling agents; impact modifiers (such as polybutadiene copolymer); chain extenders; colorants; lubricants; antistatic agents; pigments and/or delustrants such as titanium oxide, zinc oxide, talc, calcium carbonate; dispersants such as fatty amides (e.g. stearamide); metallic salts of fatty acids (e.g. zinc stearate, calcium stearate or magnesium stearate); dyes; antioxidants; odorants; fluorescent whiteners; ultraviolet absorbers (such as hydroxybenzotriazoles (e.g. Tinuvins); tertiary amine compounds to protect against air pollutants such as oxides of nitrogen; fire retardants such as brominated flame retardants such as pentabromodiphenylether; abrasives or roughening agents such as diatomaceous earth; cross-linking agents; wetting agent; thickening agents; foaming agents; and the like. Internal or external plasticizers, for example, aromatic phthalate esters exemplified by di-2-ethylhexylphthalate; aliphatic esters such as di-2-ethylhexyladipate, di-2-ethylhexylsebacate, and di-2-ethylhexylazelate; epoxy plasticizers such as epoxidized linseed oil and epoxidized soya oil; polymeric plasticizers such as poly(akylene adipates, sebecates, or azelates); chlorinated paraffins; and phosphate esters can be added. These optional addenda and their corresponding amounts can be chosen according to need. Incorporation of these optional addenda can be accomplished by any known method.

Addition of other known discoloration controls are also contemplated. For example, bromate ion and/or iodate ion as disclosed in U.S. Publication No. 2008/0242794 filed Mar. 30, 2007, can be used. Salts of bromate ion (such as sodium bromate) and/or iodate ion (such as potassium iodate) can be added either to the preparation of the silver-based antimicrobial agent (e.g., added before, during or after silver ion addition during precipitation of a silver sulfate) or later during melt-processing of the polymer, preferably prior to the addition or compounding of the silver-based antimicrobial agent.

Polymer composites can be fabricated in any known shape, such as fibers, films or blocks, or injection molded into parts of various shapes. Fibers may be solid or hollow, and either round or non-round in cross section. Fibers may assume ribbon, wedge (triangular), core (hub & spokes), multilobe (such as trilobe, cross, star and higher multilobe cross sections), elliptical, and channeled cross sections (designed to promote moisture wicking, such as in COOLMAX™ fibers). Bicomponent and multicomponent fiber configurations, such a concentric sheath/core, eccentric sheath/core, side-by-side, pie wedge, hollow pie wedge, core pie wedge, three islands, and islands-in-the-sea, are specifically contemplated. The silver-based antimicrobial agents and organo-disulfide additives of the invention may be added with the intent of being uniformly distributed throughout the various components of a multicomponent fiber, or may be added with the intent of providing a non-uniform distribution among the distinct fiber components. For example, the silver-based antimicrobial agent and/or the organo-disulfide additive may be added preferentially, in whole or in part, to the sheath of a sheath/core bicomponent fiber structure to enhance the antimicrobial efficacy or other features, such as lubricity or cohesion, at or near the surface of the bicomponent fiber. Alternatively, inclusion of a substantial portion of the silver-based antimicrobial agent in the core region, including a region from the center of the fiber outward a specified distance (e.g. one-half, one-third, one-fourth or one-fifth of the radius), of a sheath/core fiber may enhance the durability of the antimicrobial effect or other features of the multicomponent fiber.

Splittable synthetic fibers, such as those spun of at least two dissimilar polymers in either segment-splittable or dissolvable "islands-in-the-sea" format, are contemplated for use in the invention. Segment splittable fibers are typically spun with 2 to 32 segments in a round fiber, although 16 segments in a pie wedge (or "citrus") cross section and 8 segments in a hollow or core pie wedge cross section are commonly used at production scales. Microfibers of 2-4 micron diameter, typically with a wedge shaped cross section, are produced after some energy input received during subsequent textile processing (e.g. hydro-entanglement, carding, airlaying, wetlaying, needlepunching) causes the segments to separate. Segmented ribbon and segmented multilobe (e.g. segmented cross and tipped trilobe) cross sections offer enhanced fiber splittability, but the cost of spinnerets capable of forming these cross section shapes is high. Splittable segmented bicomponent fibers of nylon/polyester are commercially available (e.g. DUOTEX™ and STARFIBER™). Another polymer combination used in splittable bicomponent fibers is nylon/polypropylene.

The polymer composite or articles made therefrom, can be made using standard formation techniques. Several basic methods exist of incorporating additives, such as the silver-based antimicrobial agent and the organo-disulfide additive, within polymers on a large scale. One method is to dry blend a mixture of the polyamide polymer, any additives including the organo-disulfide additive, and the silver-based antimicrobial agent; melt the dry mix together in an extruder to form a molten composition that is then pelletized; and then finally melt and subsequently mold such pellets into a plastic article. Another method is to dry blend a mixture of the polyamide polymer and additives, melt the dry mix together in an extruder to form a molten composition, then add the silver-based antimicrobial agent.

Masterbatches of the organo-disulfide additive, silver-based antimicrobial agent, or a combination thereof can be used and compounded with the thermoplastic polyamide polymer. The masterbatch can be mixed with the thermoplastic polyamide polymer either simultaneously, same feeder, or sequentially, multiple feeders, resulting in a dilution of the masterbatch.

Articles of the polymer composite can be formed with injection molding equipment; however, other plastic-forming operations may also be utilized such as, and without limitation, blow molding, fiber extrusion, film formation, compression molding, rotational molding, and the like. These alternative plastic article-forming operations would be well understood and appreciated by one of ordinary skill in the plastics art.

One or more organo-disulfide additive of the invention can be combined with a polymeric carrier to form an initial composition. The initial composition can include other additives as well, if desired. The polymeric carrier may be any polymer suitable for the end-use application. The polymeric carrier can be miscible with the thermoplastic polyamide polymer to maintain both optical clarity (avoid opacity) and mechanical strength, if desired. The polymeric carrier can be the same as the thermoplastic polyamide polymer, a polymeric composition including some amount of the theremoplastic polyamide polymer, a different polyamide or polyamide composition, or a different polymer or polymer composition. The polymeric carrier can include compatibilizers, for example, AB block copolymers, to improve interfacial adhesion in an immiscible polyblend. Polybutylene terephthalate can be used alone or in a combination as a polymeric carrier to improve mechanical stretching properties. The polymeric carrier including the additives can be compounded with the silver-based antimicrobial agent and the thermoplastic polyamide polymer to form the polymer composite.

A polymer composite can be made by melt blending the silver-based antimicrobial agent and the organo-disulfide additive, together with any optional addenda, with the thermoplastic polyamide polymer using any suitable mixing device, such as a single screw compounder, blender, paddle compounder such as a Brabender, spatula, press, extruder, or molder such as an injection molder. Use of a batch mixer, continuous mixer, or twin-screw compounder such as a Poly-Lab, Leistritz, Berstorff, or Werner and Pfleiderrer, is preferred to ensure proper mixing.

One method for making the polymer composite is as follows. A polymeric carrier is melted in a glass, metal, or other suitable vessel, followed by addition of any additives, including the organo-disulfide additive. The polymeric carrier and additives can be mixed using a spatula until the additives are properly dispersed in the polymer carrier. A silver-based antimicrobial agent, such as silver sulfate, is then added to the polymeric carrier containing additives using a spatula until the silver-based antimicrobial agent is appropriately dispersed in the polymeric carrier containing additives. Optionally, the polymeric carrier can be melted in a small compounder, such as a Brabender compounder, followed by addition of the additives, and compounded until the additives are properly dispersed in the polymeric carrier, followed by addition of the silver-based antimicrobial agent until it is appropriately dispersed in the polymeric carrier containing additives. In another method, using a twin-screw compounder, the compounder can be provided with main feeders through which polymer pellets or powders of the polymeric carrier are fed. Additives can be mixed with and fed simultaneously with the polymer pellets or powders. Additives can also be fed using a feeder located downline from the polymeric carrier feeder. The silver-based antimicrobial agent then can be fed into the compounder using a top feeder or using a side stuffer appropriately configured.

The polymeric carrier containing the organo-disulfide additive can be compounded and collected, then fed through the main feeder before addition of the silver-based antimicrobial agent. Alternatively, the silver-based antimicrobial agent can be pre-dispersed along with the organo-disulfide additive in the polymeric carrier, and compounded subsequently. The resulting composite material obtained after compounding can be further processed into pellets, granules, strands, ribbons, fibers, powder, films, plaques, foams and the like for subsequent use. In preferred embodiments, the organo-disulfide additive is added to and dispersed in either the polyamide composition or a polymeric carrier prior to the addition of the silver-based antimicrobial agent.

Melt-processed polymers and plastics comprising a silver-based antimicrobial agent and an organo-disulfide additive provide antimicrobial (antibacterial and/or antifungal) or antiviral protection with reduced discoloration, and may be employed in a variety of applications. Typical end-use applications include, but are not limited to, extruded and non-extruded face fibers for area rugs (such as commercial, retail or residential carpet); carpet backing (either primary or secondary backing), or the latex adhesive backings used in carpet (commercial, residential or retail); liquid filtration media (such as non-woven filtration media for pools and spas, waste water treatment, potable water treatment, and industrial applications such as metalworking); non-woven air filtration media (such as commercial and residential furnace, HVAC or humidity control filters, air purifiers, and HEPA filters, and cabin air filters for automobiles and airplanes); for outdoor fabrics (such as woven and non-woven car and boat covers, tarps, tents, canvas, ducking, sails, ropes, pool covers, patio upholstery (such as umbrellas, awnings, seating), camping gear and geotextiles); as components in building materials (such as drywall, weather stripping, insulation, housewrap and roof wrap, wall covering fabrics, flooring materials such as backing for tile, shower stalls and curtains, push buttons for elevators, mats, knobs and polymer-wood composites); industrial equipment (such as tape, tubing, rope, barrier fabrics, needlepunch support, conveyor belts, gaskets, insulators and insulation for wire and cable); daily necessities (such as chopping boards, disposable gloves, bowls, handles, table cloths, trays, containers, bags, lunch boxes, dusters, sponges, brooms, mops, wipes, toothbrush holders, toothbrushes, razor blade handles, wrapping films, food wraps and packaging, toilet seats, hairbrushes, brush bristles, combs, scrubbers, tools and tool handles); stationary and writing materials (such as binders, book covers, and pocket books); automobile parts (such as a steering wheels, armrests, panels, shift knobs, switches, door knobs, assist grips, truck liners, convertible tops and interior liners); textile products (such as socks, pantyhose, undergarments, inner liners for jackets, aprons, gloves, helmets, towels, bathing suits, toilet covers, cushion pads, pillows, fiberfill for pillows and quilts, quilt backing, blankets, bedclothes, bedding, mattress ticking, sleeping bags, mattress cover pads and filling, nose and mouth masks, towels, caps, hats, wigs); goods related to public transportation (such as overhead straps, handles and grips, levers, seats, seat belts, luggage and storage racks); sporting goods (such as balls, nets, pucks, whistles, mouth pieces, racket handles, performance clothing, protective gear, helmets, indoor and outdoor artificial turf, shoe linings and reinforcements, tools, structures and ceremonial objects used in athletic events and the martial arts); medical equipment (such as bandages, gauze, catheters, artificial limbs, implants, instruments, scrubs, facemasks, shields, reusable and disposable diapers, sanitary napkins, tampons, condoms, uniforms, gowns and other hospital garments requiring aggressive and harsh cleaning treatments to allow the garment to be safely worm by more than one person); musical instruments (such as in reeds, strings and mouthpieces); holders; plastic credit/debit cards; wristwatch bands; and jewelry.

Another emerging application to which the present invention is particularly applicable is antimicrobial nonwoven fabrics, which are textiles that are neither woven nor knit. Non-woven fabric is typically manufactured by putting small fibers together in the form of a sheet or web, and then binding them either mechanically (as in the case of felt, by interlocking them with serrated needles such that the inter-fiber friction results in a stronger fabric), with an adhesive, or thermally by applying binder in the form of a powder, paste, or polymer melt, and then melting the binder onto the web by increasing the temperature or by a thermal spot bonding process. Commercial processes are well known in the art for producing continuous microfilament nonwoven fabrics of many polymers, including polyamides. A specialty spunbond nonwoven (CEREX™) consists of continuous nylon filaments bonded into a flat, smooth, strong, crisp fabric. Nylon is also used as a blending fiber in athletic wear, nonwoven garment linings, and in nonwoven wipes because it imparts excellent tear strength (commercial offerings include, for example, NYLON 90™ available from Carolina Formed Fabrics Corporation (USA)). Nylon is often used in surface conditioning abrasives wherein abrasive grains are adhered with resin to the internal fiber surfaces of a nonwoven nylon backing/support.

Discoloration in polymers is chiefly a concern about excessive yellowness, and is reported in terms of the 1976 CIE b* coordinate, wherein b* is a measure of the yellowness or blueness of the plaque. Values of b* that are closer to zero represent less color, and, specifically, b* values that are less positive are indicative of superior inhibition of yellow discoloration in polymer composites containing a silver-based antimicrobial. The percent change in b* relative to a check comparison is defined by the expression (b*(comparative)−b*(example))/(b*(comparative)×100). A preferred percent change in b* value is at least 30%, a more preferred percent change in b* is at least 50%. Further description of the colorimetric test procedure is contained in Billmeyer, F. W., et al., *Principles of Color Technology*, 2nd Edition, pp. 62-64, published by John Wiley & Sons, Inc., 1981; or in ASTM Designations: D 2244-05 and D 1729-96.

The chemicals used in the examples are:

| Product Name | Chemical Name | CAS No. | Supplier | Identifier |
| --- | --- | --- | --- | --- |
| Ultramid B29HM01 | Nylon 6 | 25038-54-4 | BASF | N6 |
| Ultramid A27EZ01 | Nylon 6,6 | 32131-17-2 | BASF | N66 |
| Celanex 1400A EF-NAT | Polybutylene terephthalate | 24968-12-5 | Ticona | PBT |
| HOSTANOX O10 | Pentaerythrityl-tetrakis 3-(3,5-di-tert-butyl-4-hydroxy-phenyl)propionate | 6683-19-8 | Clariant | O10 |
| HOSTANOX SE 10 | Dioctadecyl disulfide | 2500-88-1 | Clariant | SE10 |
| HOSTANOX PAR 62 | Bis(2,4-di-tert-butylphenyl) pentaerythritol diphosphite | 26741-53-7 | Clariant | PAR62 |
| SANDOSTAB P-EPQ | Tetrakis(2,4-di-tert-butylphenyl)4,4'-biphenylene diphosphonite | 119345-01-6 | Clariant | P-EPQ |
| Diphenyl Disulfide | Diphenyl disulphide | 882-33-7 | Eastman Kodak | DPDS |
| Hostanox O310XP | Benzenepropanoic acid, 3-(1,1-dimethylethyl)-β-[3-(1,1-dimethylethyl)-4-hydroxyphenyl]-4-hydroxy-β-methyl-, 1,1'-(1,2-ethanediyl) ester and Pentaerythrityl-tetrakis 3-(3,5-di-tert-butyl-4-hydroxy-phenyl)propionate | 32509-66-3 6683-19-8 | Clariant | O310XP |
| Nylostab S-EED | 1,3-Benzenedicarboxamide, N1,N3-bis(2,2,6,6-tetramethyl-4-piperidinyl) | 42774-15-2 | Clariant | N-SEED |
| $Ag_2SO_4$ | Silver sulfate | 10294-26-5 | Riverside Chemical | XR |
| $Ag_2SO_4$ | Silver sulfate | 10294-26-5 | Preparation described below | X051 |
| $Ag_2SO_4$ | Silver sulfate | 10294-26-5 | Preparation described below | X30 |

The following examples are intended to demonstrate various features of the invention.

EXAMPLES

Discoloration of the polyamide containing composites in the following examples was quantified by pressing a sample of the polymer composite into a flat plaque and measuring the spectral response in a HunterLab UltraScan XE colorimeter.

Preparation of Silver Sulfate Sample X051:

An eighteen-liter stainless steel sponge kettle was charged with 4 L of distilled water and the temperature controlled at 10° C. A planar mixing device (previously described in *Research Disclosure* 38213, February 1996 pp 111-114 "Mixer for Improved Control Over Reaction Environment") operating at 5000 rpm was used to ensure the homogeneity of the reactor contents. To this reactor 4.32 L of an 8M solution of $H_2SO_4$ was added. The resultant pH was <1. A peristaltic pump was used to deliver an 8 L solution containing 5.7M silver nitrate at a rate of 225 mL/min causing precipitation of a white product. The measured pH was <1. The reaction was held at 10° C. for 15 minutes. The final product was washed to a conductivity of <10 mS and dried at ambient temperature, followed by further drying for 2 hours at 150° C. Powder X-ray diffraction confirmed the product was compositionally homogeneous single-phase silver sulfate.

Preparation of Silver Sulfate Sample X30:

An eighteen-liter stainless steel sponge kettle was charged with 5.5 L of distilled water and the temperature controlled at 40° C. A planar mixing device previously described (U.S. Pat. No. 6,422,736) operating at 3600 rpm was used to ensure the homogeneity of the reactor contents. To this reactor 427 mL of a 3.6M solution of ammonium sulfate was added. Peristaltic pumps were used to simultaneously deliver a 3840 mL solution containing 3.1 M silver nitrate at a rate of 225.0 mL/min, a 2000 mL solution containing 2.9M ammonium sulfate at a rate of 117.1 mL/min and a 400 mL solution containing 6 g of potassium iodate at a rate of 23.3 mL/min causing precipitation of a white product. The reaction was held at 40° C. for 5 min after which a peristaltic pump delivered a 400 mL solution containing 6 g potassium iodate at a rate of 40.0 mL/min. The reaction was held at 40° C. for 5 min. The final product was washed to a conductivity of <10 mS and a portion dried at ambient temperature for 24 h followed by further drying for 4 h at 85° C. Powder X-ray diffraction confirmed the product was compositionally homogeneous single-phase silver sulfate.

Examples 1-10

Examples 1-10 demonstrate organo-disulfide additives of the invention in nylon 6 polyamide using the XR source of silver sulfate as the silver-based antimicrobial agent.

Example 1

A Brabender paddle compounder was preheated to 245° C. and the mixing paddles were set to 60 rpm. Into the feed chamber was charged 40 grams of N6, and compounded 4.5 minutes under a dry nitrogen purge. The mixing paddles were stopped, and the feed chamber was dismantled. The compounded Example 1 sample was removed from the chamber walls and paddles, and pressed onto a stainless steel plate, with the original stainless steel plate temperature of 23° C. The pressed Example 1 sample was measured for color using a HunterLab UltraScan XE colorimeter and the b* value recorded.

Example 2

A Brabender paddle compounder was preheated to 245° C. and the mixing paddles were set to 60 rpm. Into the feed chamber was charged 39.96 grams of N6, and compounded 4 minutes under a dry nitrogen purge. Following the melting of the N6, 0.04 g of SE10 was added to the feed chamber and the initial composition was compounded 1 minute under a dry nitrogen purge. The mixing paddles were stopped, and the feed chamber was dismantled. The compounded Example 2 sample was removed from the chamber walls and paddles, and pressed onto a stainless steel plate, with the original stainless steel plate temperature of 23° C. The pressed Example 2 sample was measured for color using a HunterLab UltraScan XE colorimeter and the b* value recorded.

Example 3

A Brabender paddle compounder was preheated to 245° C. and the mixing paddles were set to 60 rpm. Into the feed chamber was charged 39.8 grams of N6, and compounded 4 minutes under a dry nitrogen purge. Following the melting of the N6, 0.2 g of XR was added to the feed chamber and the initial composition was compounded 1 minute under a dry nitrogen purge. The mixing paddles were stopped, and the feed chamber was dismantled. The compounded Example 3 sample was removed from the chamber walls and paddles, and pressed onto a stainless steel plate, with the original stainless steel plate temperature of 23° C. The pressed Example 3 sample was measured for color using a HunterLab UltraScan XE calorimeter and the b* value recorded.

Example 4

A Brabender paddle compounder was preheated to 245° C. and the mixing paddles were set to 60 rpm. Into the feed chamber was charged 39-76 grams of N6, and compounded 3 minutes under a dry nitrogen purge. Following the melting of the N6, 0.04 g of O10 was added to the feed chamber and the initial composition was compounded 1 minute under a dry nitrogen purge. Following the compounding of the initial composition, 0.2 g of XR was added to the feed chamber and the composite was compounded 1 minute under a nitrogen purge. The mixing paddles were stopped, and the feed chamber was dismantled. The compounded Example 4 sample was removed from the chamber walls and paddles, and pressed onto a stainless steel plate, with the original stainless steel plate temperature of 23° C. The pressed Example 4 sample was measured for color using a HunterLab UltraScan XE colorimeter and the b* value recorded.

Example 5

A Brabender paddle compounder was preheated to 245° C. and the mixing paddles were set to 60 rpm. Into the feed chamber was charged 39.76 grams of N6, and compounded 3 minutes under a dry nitrogen purge. Following the melting of the N6, 0.04 g of O310XP was added to the feed chamber and the initial composition was compounded 1 minute under a dry nitrogen purge. Following the compounding of the initial composition, 0.2 g of XR was added to the feed chamber and the composite was compounded 1 minute under a nitrogen purge. The mixing paddles were stopped, and the feed chamber was dismantled. The compounded Example 5 sample was removed from the chamber walls and paddles, and pressed onto a stainless steel plate, with the original stainless steel plate temperature of 23° C. The pressed Example 5 sample was measured for color using a HunterLab UltraScan XE calorimeter and the b* value recorded.

Example 6

A Brabender paddle compounder was preheated to 245° C. and the mixing paddles were set to 60 rpm. Into the feed chamber was charged 39.76 grams of N6, and compounded 3 minutes under a dry nitrogen purge. Following the melting of the N6, 0.04 g of S-EED was added to the feed chamber and the initial composition was compounded 1 minute under a dry nitrogen purge. Following the compounding of the initial composition, 0.2 g of XR was added to the feed chamber and the composite was compounded 1 minute under a nitrogen purge. The mixing paddles were stopped, and the feed chamber was dismantled. The compounded Example 6 sample was removed from the chamber walls and paddles, and pressed onto a stainless steel plate, with the original stainless steel plate temperature of 23° C. The pressed Example 6 sample was measured for color using a HunterLab UltraScan XE calorimeter and the b* value recorded.

Example 7

A Brabender paddle compounder was preheated to 245° C. and the mixing paddles were set to 60 rpm. Into the feed chamber was charged 39.78 grams of N6, and compounded 3 minutes under a dry nitrogen purge. Following the melting of the N6, 0.02 g of SE10 was added to the feed chamber and the initial composition was compounded 1 minute under a dry nitrogen purge. Following the compounding of the initial composition, 0.2 g of XR was added to the feed chamber and the composite was compounded 1 minute under a nitrogen purge. The mixing paddles were stopped, and the feed chamber was dismantled. The compounded Example 7 sample was removed from the chamber walls and paddles, and pressed onto a stainless steel plate, with the original stainless steel plate temperature of 23° C. The pressed Example 7 sample was measured for color using a HunterLab UltraScan XE calorimeter and the b* value recorded.

Example 8

A Brabender paddle compounder was preheated to 245° C. and the mixing paddles were set to 60 rpm. Into the feed chamber was charged 39.76 grams of N6, and compounded 3 minutes under a dry nitrogen purge. Following the melting of the N6, 0.04 g of SE10 was added to the feed chamber and the initial composition was compounded 1 minute under a dry nitrogen purge. Following the compounding of the initial composition, 0.2 g of XR was added to the feed chamber and the composite was compounded 1 minute under a nitrogen purge. The mixing paddles were stopped, and the feed chamber was dismantled. The compounded Example 8 sample was removed from the chamber walls and paddles, and pressed onto a stainless steel plate, with the original stainless steel plate temperature of 23° C. The pressed Example 8 sample was measured for color using a HunterLab UltraScan XE colorimeter and the b* value recorded.

Example 9

A Brabender paddle compounder was preheated to 245° C. and the mixing paddles were set to 60 rpm. Into the feed chamber was charged 39.76 grams of N6, and compounded 3 minutes under a dry nitrogen purge. Following the melting of the N6, a premixed powder consisting of 0.04 g SE10 and 0.2 g of XR was added to the feed chamber and the initial composition was compounded 1 minute under a dry nitrogen purge. The mixing paddles were stopped, and the feed chamber was dismantled. The compounded Example 9 sample was removed from the chamber walls and paddles, and pressed onto a stainless steel plate, with the original stainless steel plate temperature of 23° C. The pressed Example 9 sample was measured for color using a HunterLab UltraScan XE colorimeter and the b* value recorded.

Example 10

A Brabender paddle compounder was preheated to 245° C. and the mixing paddles were set to 60 rpm. Into the feed chamber was charged 39.76 grams of N6, and compounded 3 minutes under a dry nitrogen purge. Following the melting of the N6, 0.04 g of DPDS was added to the feed chamber and the initial composition was compounded 1 minute under a dry nitrogen purge. Following the compounding of the initial composition, 0.2 g of XR was added to the feed chamber and the composite was compounded 1 minute under a nitrogen purge. The mixing paddles were stopped, and the feed chamber was dismantled. The compounded Example 10 sample was removed from the chamber walls and paddles, and pressed onto a stainless steel plate, with the original stainless steel plate temperature of 23° C. The pressed Example 10 sample was measured for color using a HunterLab UltraScan XE calorimeter and the b* value recorded.

Table 1 given below contains colorimetric results for Examples 1-10, wherein the % change in b* results for the additive-containing Examples 4-10 are referenced to the no additive-containing comparative Example 3.

TABLE 1

| Example ID | Ag Salt | Additive | b* | % Change in b* |
|---|---|---|---|---|
| 1 (comparative) | None | None | 0.18 | — |
| 2 (comparative) | None | 0.1% SE10 | 1.10 | — |
| 3 (comparative) | 0.5% XR | None | 30.22 | — |
| 4 (comparative) | 0.5% XR | 0.1% O10 | 31.49 | −4 |
| 5 (comparative) | 0.5% XR | 0.1% O310XP | 35.05 | −16 |
| 6 (comparative) | 0.5% XR | 0.1% N-SEED | 30.01 | <1 |
| 7 (inventive) | 0.5% XR | 0.05% SE10 | 14.17 | 53 |
| 8 (inventive) | 0.5% XR | 0.1% SE10 | 5.32 | 82 |
| 9 (inventive) | 0.5% XR | 0.1% SE10 | 12.32 | 59 |
| 10 (inventive) | 0.5% XR | 0.1% DPDS | 13.22 | 56 |

Comparison of b* results shown above for Examples 1 and 2 indicates that the addition of the organo-disulfide (Hostanox SE10) additive to nylon 6 in the absence of a silver salt has a small effect in increasing the yellow discoloration of melt-processed nylon 6. Comparison of results for Examples 1 and 3 indicates that the addition of even a modest amount (0.5 weight percent XR) of silver sulfate (30.22 b*) to melt-processed nylon 6 increases the yellow discoloration by over 150 times that normally present due to thermal processing (0.18 b*). Comparison of results for Examples 4-6 to Example 3 indicate that the addition of conventional organo-phenolic antioxidants (Hostanox O10, Hostanox O310XP) or organo-amide (Nylostab S-EED) stabilizers are not effective in reducing the yellow discoloration of melt-processed nylon 6 in samples containing silver sulfate. These results indicate that the addition of known commercially available antioxidants or a nylon specific stabilizer to nylon 6 fail to substantially impact the extreme yellowness resulting from the presence of a silver-based antimicrobial agent in melt-processed polyamide. Comparison of b* results shown above for Examples 7-8 to Example 3 indicates that when an organo-disulfide (Hostanox SE10, dioctadecyl disulfide) is added to and dispersed in nylon 6 prior to the addition of the silver sulfide, a remarkable reduction in yellowness is achieved. Comparison of results for Example 9 to Example 3 and Example 8 indicates that while the process of adding the organo-disulfide simultaneously with the silver-based antimicrobial agent (i.e. SE10 and XR are premixed in Example 9) is highly effective in reducing the b* value of melt-processed nylon 6 from 30.22 to 12.32, this process is substantially less effective relative to the process of adding and dispersing the organo-disulfide prior to the addition of silver sulfate, as employed in Example 8 (5.32 b*). Comparison of results for Example 10 to Example 3 indicates that the addition of diphenyl disulfide (DPDS) is also very effective in reducing the yellow discoloration of melt-processed nylon 6 containing silver sulfate.

Examples 11-12

Examples 11-12 demonstrate an organo-disulfide additive of the invention in nylon 6 polyamide using the X051 source of silver sulfate as the silver-based antimicrobial agent.

Example 11

A Brabender paddle compounder was preheated to 245° C. and the mixing paddles were set to 60 rpm. Into the feed chamber was charged 39.8 grams of vacuum dried N6, and compounded 4 minutes under a dry nitrogen purge. Following the melting of the N6, 0.2 g of X051 was added to the feed chamber and the initial composition was compounded 1 minute under a dry nitrogen purge. The mixing paddles were stopped, and the feed chamber was dismantled. The compounded Example 11 sample was removed from the chamber walls and paddles, and pressed onto a stainless steel plate, with the original stainless steel plate temperature of 23° C. The pressed Example 11 sample was measured for color using a HunterLab UltraScan XE calorimeter and the b* value recorded.

Example 12

A Brabender paddle compounder was preheated to 245° C. and the mixing paddles were set to 60 rpm. Into the feed chamber was charged 39.72 grams of vacuum dried N6, and compounded 3 minutes under a dry nitrogen purge. Following the melting of the N6, 0.08 g of SE10 was added to the feed chamber and the initial composition was compounded 1 minute under a dry nitrogen purge. Following the compounding of the initial composition, 0.2 g of X051 was added to the feed chamber and the composite was compounded 1 minute under a nitrogen purge. The mixing paddles were stopped, and the feed chamber was dismantled. The compounded Example 12 sample was removed from the chamber walls and paddles, and pressed onto a stainless steel plate, with the original stainless steel plate temperature of 23° C. The pressed Example 12 sample was measured for color using a HunterLab UltraScan XE calorimeter and the b* value recorded.

Table 2 given below contains colorimetric results for Examples 11-12, wherein the % change in b* results for organo-disulfide additive-containing Example 12 is referenced to the no organo-disulfide additive-containing comparative Example 11.

TABLE 2

| Example ID | Ag Salt | Additive | b* | % Change in b* |
|---|---|---|---|---|
| 1 (comparative) | None | None | 0.18 | — |
| 11 (comparative) | 0.5% X051 | None | 26.88 | — |
| 12 (inventive) | 0.5% X051 | 0.1% SE10 | 5.91 | 78 |

Comparison of b* results shown above for Examples 1 and 11 indicates once more that the addition of even a modest amount of silver sulfate (0.5 weight percent X051) to melt-processed nylon 6 increases the yellow discoloration by about 150 times that normally present due to thermal processing. Comparison of b* results shown above for Examples 11 and 12 indicates that the addition of an organo-disulfide (Hostanox SE10, dioctadecyl disulfide) additive prior to the addition of silver sulfate (sample X051) is very effective in reducing the yellow discoloration of melt-processed nylon 6.

Examples 13-15

Examples 13-15 demonstrate an organo-disulfide additive of the invention in nylon 6 polyamide using the X030 source of silver sulfate, which contains a minor amount of potassium iodate color stabilizer, as the silver-based antimicrobial agent.

Example 13

A Brabender paddle compounder was preheated to 245° C. and the mixing paddles were set to 60 rpm. Into the feed chamber was charged 39.8 grams of N6, and compounded 4 minutes under a dry nitrogen purge. Following the melting of the N6, 0.2 g of X30 was added to the feed chamber and the initial composition was compounded 1 minute under a dry nitrogen purge. The mixing paddles were stopped, and the feed chamber was dismantled. The compounded Example 13 sample was removed from the chamber walls and paddles, and pressed onto a stainless steel plate, with the original stainless steel plate temperature of 23° C. The pressed Example 13 sample was measured for color using a HunterLab UltraScan XE colorimeter and the b* value recorded.

Example 14

A Brabender paddle compounder was preheated to 245° C. and the mixing paddles were set to 60 rpm. Into the feed chamber was charged 39.78 grams of N6, and compounded 3 minutes under a dry nitrogen purge. Following the melting of the N6, 0.02 g of SE10 was added to the feed chamber and the initial composition was compounded 1 minute under a dry nitrogen purge. Following the compounding of the initial composition, 0.2 g of X30 was added to the feed chamber and the composite was compounded 1 minute under a nitrogen purge. The mixing paddles were stopped, and the feed chamber was dismantled. The compounded Example 14 sample was removed from the chamber walls and paddles, and pressed onto a stainless steel plate, with the original stainless steel plate temperature of 23° C. The pressed Example 14 sample was measured for color using a HunterLab UltraScan XE colorimeter and the b* value recorded.

Example 15

A Brabender paddle compounder was preheated to 245° C. and the mixing paddles were set to 60 rpm. Into the feed chamber was charged 39.76 grams of N6, and compounded 3 minutes under a dry nitrogen purge. Following the melting of the N6, 0.04 g of SE10 was added to the feed chamber and the initial composition was compounded 1 minute under a dry nitrogen purge. Following the compounding of the initial composition, 0.2 g of X30 was added to the feed chamber and the composite was compounded 1 minute under a nitrogen purge. The mixing paddles were stopped, and the feed chamber was dismantled. The compounded Example 15 sample was removed from the chamber walls and paddles, and pressed onto a stainless steel plate, with the original stainless steel plate temperature of 23° C. The pressed Example 15 sample was measured for color using a HunterLab UltraScan XE colorimeter and the b* value recorded.

Table 3 given below contains colorimetric results for Examples 13-15, wherein the % change in b* results for organo-disulfide additive-containing Examples 14-15 are referenced to the no organo-disulfide additive-containing comparative Example 13.

TABLE 3

| Example ID | Ag Salt | Additive | b* | % Change in b* |
|---|---|---|---|---|
| 1 (comparative) | None | None | 0.18 | — |
| 13 (comparative) | 0.5% X30 | None | 22.21 | — |
| 14 (inventive) | 0.5% X30 | 0.05% SE10 | 5.91 | 73 |
| 15 (inventive) | 0.5% X30 | 0.1% SE10 | 8.79 | 60 |

Comparison of b* results shown above for Examples 1 and 13 indicates that the addition of even a modest amount of silver sulfate (0.5 weight percent X30) containing a minor amount of potassium iodate as a color stabilizer, to melt-processed nylon 6 increases the yellow discoloration by about 100 times that normally present due to conventional thermal yellowing. Comparison of b* results shown above for Examples 14-15 to those for Example 13 indicate that the addition of an organo-disulfide (Hostanox SE10, dioctadecyl disulfide) additive prior to the addition of silver sulfate (sample X30) stabilized by potassium iodate is remarkably effective in reducing the yellow discoloration of melt-processed nylon 6.

Examples 16-18

Examples 16-18 demonstrate an organo-disulfide additive of the invention in nylon 6 polyamide wherein PBT is employed as a polymeric carrier for addition of the silver-based antimicrobial agent and the organo-disulfide additive.

Example 16

A Brabender paddle compounder was preheated to 245° C. and the mixing paddles were set to 60 rpm. Into the feed chamber was charged 39.6 grams of N6, and compounded 3 minutes under a dry nitrogen purge. Following the melting of the N6, 0.4 g of a PBT/X30 composite was added to the feed chamber and the final composition was compounded 1 minute under a dry nitrogen purge (the PBT/X30 composite was generated as follows: a Brabender paddle compounder was preheated to 235° C. and the mixing paddles were set to 60 rpm. Into the feed chamber was charged 38 grams of PBT, and compounded 3 minutes under a dry nitrogen purge. Following the melting of the PBT, 2 g of X30 was added to the feed chamber and the initial composition was compounded 1 minute under a dry nitrogen purge. The mixing paddles were stopped, and the feed chamber was dismantled. The PBT/X30 composite sample was removed from the chamber walls and paddles, and pressed onto a stainless steel plate, with the original stainless steel plate temperature of 23° C.). The mixing paddles were stopped, and the feed chamber was dismantled. The compounded Example 16 sample was removed from the chamber walls and paddles, and pressed onto a stainless steel plate, with the original stainless steel plate temperature of 23° C. The pressed Example 16 sample was measured for color using a HunterLab UltraScan XE colorimeter and the b* value recorded.

Example 17

A Brabender paddle compounder was preheated to 245° C. and the mixing paddles were set to 60 rpm. Into the feed chamber was charged 39.6 grams of N6, and compounded 3 minutes under a dry nitrogen purge. Following the melting of the N6, 0.4 g of a PBT/SE10/X30 composite was added to the feed chamber and the final composition was compounded 1 minute under a dry nitrogen purge (the PBT/SE10/X30 composite was generated as follows: a Brabender paddle compounder was preheated to 235° C. and the mixing paddles were set to 60 rpm. Into the feed chamber was charged 37.96 grams of PBT, and compounded 2.5 minutes under a dry nitrogen purge. Following the melting of the PBT, 0.04 g of SE10 was added to the feed chamber and the initial composition was compounded 0.5 minutes under a dry nitrogen purge. Following the compounding of the initial composition, 2 g of X30 was added to the feed chamber and the composite was compounded 1 minute under a nitrogen purge. The mixing paddles were stopped, and the feed chamber was dismantled. The PBT/SE10/X30 composite sample was removed from the chamber walls and paddles, and pressed onto a stainless steel plate, with the original stainless steel plate temperature of 23° C.). The mixing paddles were stopped, and the feed chamber was dismantled. The compounded Example 17 sample was removed from the chamber walls and paddles, and pressed onto a stainless steel plate, with the original stainless steel plate temperature of 23° C. The pressed Example 17 sample was measured for color using a HunterLab UltraScan XE colorimeter and the b* value recorded.

Example 18

A Brabender paddle compounder was preheated to 245° C. and the mixing paddles were set to 60 rpm. Into the feed chamber was charged 39.6 grams of N6, and compounded 3 minutes under a dry nitrogen purge. Following the melting of the N6, 0.04 g of SE10 was added to the feed chamber and the initial composition was compounded 1 minute under a dry nitrogen purge. Following the melting of the initial composition, 0.4 g of a PBT/SE10/X30 composite was added to the feed chamber and the final composition was compounded 1 minute under a dry nitrogen purge (the PBT/SE10/X30 composite was generated as described in Example 17). The mixing paddles were stopped, and the feed chamber was dismantled. The compounded Example 18 sample was removed from the chamber walls and paddles, and pressed onto a stainless steel plate, with the original stainless steel plate temperature of 23° C. The pressed Example 18 sample was measured for color using a HunterLab UltraScan XE colorimeter and the b* value recorded.

Table 4 given below contains colorimetric results for Examples 16-18, wherein PBT is employed as a polymeric carrier for the silver-based antimicrobial agent, and the organo-disulfide additive of the invention is introduced either via the same polymeric carrier addition or via both a prior major addition along with the later minor polymeric carrier addition, and wherein the % change in b* results for organo-disulfide additive-containing Examples 17-18 are referenced to the no additive-containing comparative Example 16.

TABLE 4

| Example ID | Ag Salt | PBT composition | Additive in Nylon 6 | b* | % Change in b* |
|---|---|---|---|---|---|
| 16 (comparative) | 0.05% X30 | 100% PBT | None | 12.58 | — |
| 17 (inventive) | 0.05% X30 | 94.9% PBT, 0.1% SE10, 5.0% X30 | None | 12.43 | 1.2 |
| 18 (inventive) | 0.05% X30 | 94.9% PBT, 0.1% SE10, 5.0% X30 | 0.1% SE10 | 4.92 | 61 |

Comparison of b* results shown above for Examples 16 and 17 indicates that the process used in Example 17 of simultaneous addition of a relatively small amount of an organo-disulfide (Hostanox SE10) additive along with the silver sulfate via compounding the organo-disulfide additive in PBT polymeric carrier before compounding the silver sulfate in the PBT polymeric carrier, is only marginally effective in reducing the yellow discoloration of melt-processed nylon 6/PBT. This process may in tern required significantly larger amounts of organo-disulfide additive than used in Example 17 above (only 0.001% SE10 is present in the final composite) to achieve acceptable color. Results shown above for Example 18, however, demonstrate the superior b* results when an organo-disulfide additive of the invention (0.1% SE10 in the final composite) is added and dispersed in the bulk of the nylon 6 polyamide prior to the subsequent addition of both the silver-based antimicrobial agent and a smaller amount (0.001% SE10) of organo-disulfide via the PBT polymeric carrier.

Examples 19-26

Examples 19-26 demonstrate an organo-disulfide additive of the invention in nylon 6,6 polyamide using three different sources of silver sulfate as the silver-based antimicrobial agent.

Example 19

A Brabender paddle compounder was preheated to 295° C. and the mixing paddles were set to 60 rpm. Into the feed chamber was charged 40 grams of N66, and compounded 5 minutes under a dry nitrogen purge. The mixing paddles were stopped, and the feed chamber was dismantled. The compounded Example 19 sample was removed from the chamber walls and paddles, and pressed onto a stainless steel plate, with the original stainless steel plate temperature of 23° C. The pressed Example 19 sample was measured for color using a HunterLab UltraScan XE colorimeter and the b* value recorded.

Example 20

A Brabender paddle compounder was preheated to 295° C. and the mixing paddles were set to 60 rpm. Into the feed chamber was charged 39.96 grams of N66, and compounded 4 minutes under a dry nitrogen purge. Following the melting of the N66, 0.04 g of SE10 was added to the feed chamber and the initial composition was compounded 0.5 minutes under a dry nitrogen purge. The mixing paddles were stopped, and the feed chamber was dismantled. The compounded Example 20 sample was removed from the chamber walls and paddles, and pressed onto a stainless steel plate, with the original stainless steel plate temperature of 23° C. The pressed Example 20 sample was measured for color using a HunterLab UltraScan XE colorimeter and the b* value recorded.

Example 21

A Brabender paddle compounder was preheated to 295° C. and the mixing paddles were set to 60 rpm. Into the feed chamber was charged 39.8 grams of N66, and compounded 4 minutes under a dry nitrogen purge. Following the melting of the N66 0.2 g of XR was added to the feed chamber and the initial composition was compounded 1 minute under a dry nitrogen purge. The mixing paddles were stopped, and the feed chamber was dismantled. The compounded Example 21 sample was removed from the chamber walls and paddles, and pressed onto a stainless steel plate, with the original stainless steel plate temperature of 23° C. The pressed Example 21 sample was measured for color using a HunterLab UltraScan XE colorimeter and the b* value recorded.

Example 22

A Brabender paddle compounder was preheated to 295° C. and the mixing paddles were set to 60 rpm. Into the feed chamber was charged 39.76 grams of N66 and compounded 3 minutes under a dry nitrogen purge. Following the melting of the N66 0.04 g of SE10 was added to the feed chamber and the initial composition was compounded 1 minute under a dry nitrogen purge. Following the compounding of the initial composition, 0.2 g of XR was added to the feed chamber and the composite was compounded 1 minute under a nitrogen purge. The mixing paddles were stopped, and the feed chamber was dismantled. The compounded Example 22 sample was removed from the chamber walls and paddles, and pressed onto a stainless steel plate, with the original stainless steel plate temperature of 23° C. The pressed Example 22 sample was measured for color using a HunterLab UltraScan XE colorimeter and the b* value recorded.

Table 5 given below contains colorimetric results for Examples 19-22, wherein the % change in b* results for organo-disulfide additive-containing Example 22 is referenced to the no organo-disulfide additive-containing comparative Example 21.

TABLE 5

| Example ID | Ag Salt | Additive | b* | % Change in b* |
|---|---|---|---|---|
| 19 (comparative) | None | None | 13.61 | — |
| 20 (comparative) | None | 0.1% SE10 | 12.35 | — |
| 21 (comparative) | 0.5% XR | None | 21.16 | — |
| 22 (inventive) | 0.5% XR | 0.1% SE10 | 9.26 | 56 |

Comparison of the b* results for nylon 6 (Example 1, 0.18) and nylon 6,6 (Example 19, 13.61) shown above indicates a much greater amount of conventional thermal yellowing for the nylon 6,6 polyamide, which melts at a significantly higher temperature (about 50° C. higher). Comparison results shown above for Examples 19 and 20 indicate that the addition of an organo-disulfide (Hostanox SE10) additive to nylon 6,6 in the absence of a silver salt has a small effect in decreasing the yellow discoloration of melt-processed nylon 6,6. Comparison of results shown above for Example 20 and 21 indicates a large increase in yellowness when silver sulfate is compounded into melt-processed nylon 6,6. Comparison of b* results shown above for Examples 21 and 22 indicates that the addition of an organo-disulfide (Hostanox SE10, dioctadecyl disulfide) additive prior to the addition of silver sulfate (sample XR) is remarkably and surprisingly effective in reducing the yellow discoloration of melt-processed nylon 6,6; reducing the degree of yellowness to a level less than that normally present after melt-processing (Example 19).

Examples 23-24

Examples 23-24 demonstrate an organo-disulfide additive of the invention in nylon 6,6 polyamide using the X051 source of silver sulfate as the silver-based antimicrobial agent.

Example 23

A Brabender paddle compounder was preheated to 295° C. and the mixing paddles were set to 60 rpm. Into the feed chamber was charged 39.8 grams of N66 and compounded 4 minutes under a dry nitrogen purge. Following the melting of the N66 0.2 g of X051 was added to the feed chamber and the initial composition was compounded 1 minute under a dry nitrogen purge. The mixing paddles were stopped, and the feed chamber was dismantled. The compounded Example 23 sample was removed from the chamber walls and paddles, and pressed onto a stainless steel plate, with the original stainless steel plate temperature of 23° C. The pressed Example 23 sample was measured for color using a Hunter-Lab UltraScan XE colorimeter and the b* value recorded.

Example 24

A Brabender paddle compounder was preheated to 295° C. and the mixing paddles were set to 60 rpm. Into the feed chamber was charged 39.76 grams of N6,6 and compounded 3 minutes under a dry nitrogen purge. Following the melting of the N6,6 0.04 g of SE10 was added to the feed chamber and the initial composition was compounded 1 minute under a dry nitrogen purge. Following the compounding of the initial composition, 0.2 g of X051 was added to the feed chamber and the composite was compounded 1 minute under a nitrogen purge. The mixing paddles were stopped, and the feed chamber was dismantled. The compounded Example 24 sample was removed from the chamber walls and paddles, and pressed onto a stainless steel plate, with the original stainless steel plate temperature of 23° C. The pressed Example 24 sample was measured for color using a Hunter-Lab UltraScan XE colorimeter, with a* and b* value recorded.

Table 6 given below contains colorimetric results for Examples 23-24, wherein the % change in b* results for organo-disulfide additive-containing Example 24 is referenced to the no organo-disulfide additive-containing comparative Example 23.

TABLE 6

| Example ID | Ag Salt | Additive | b* | % Change in b* |
|---|---|---|---|---|
| 19 (comparative) | None | None | 13.61 | — |
| 23 (comparative) | 0.5% X051 | None | 22.92 | — |
| 24 (inventive) | 0.5% X051 | 0.1% SE10 | 6.56 | 71 |

Comparison of b* results shown above for Examples 19 and 23 indicates that the addition of even a modest amount of silver sulfate (0.5 weight percent X051) to melt-processed nylon 6,6 increases the yellow discoloration significantly relative to that normally present due to thermal processing. Comparison of b* results shown above for Example 24 to those of Example 23 indicates that the addition of an organo-disulfide (Hostanox SE10, dioctadecyl disulfide) additive prior to the addition of silver sulfate (sample X051) is remarkably and surprisingly effective in reducing the yellow discoloration of melt-processed nylon 6,6; reducing the degree of yellowness to a level smaller than that normally present after melt-processing (Example 19).

Examples 25-26

Examples 25-26 demonstrate an organo-disulfide additive of the invention in nylon 6,6 polyamide wherein PBT is employed as a polymeric carrier for addition of the silver-based antimicrobial agent.

Example 25

A Brabender paddle compounder was preheated to 295° C. and the mixing paddles were set to 60 rpm. Into the feed chamber was charged 39.6 grams of N66, and compounded 3 minutes under a dry nitrogen purge. Following the melting of the N66, 0.4 g of a PBT/SE10/X30 composite was added to the feed chamber and the final composition was compounded 1 minute under a dry nitrogen purge (the PBT/SE10/X30 composite was generated as described in Example 17). The mixing paddles were stopped, and the feed chamber was dismantled. The compounded Example 25 sample was removed from the chamber walls and paddles, and pressed onto a stainless steel plate, with the original stainless steel plate temperature of 23° C. The pressed Example 25 sample was measured for color using a HunterLab UltraScan XE colorimeter and the b* value recorded.

Example 26

A Brabender paddle compounder was preheated to 295° C. and the mixing paddles were set to 60 rpm. Into the feed chamber was charged 39.2 grams of N66, and compounded 2.5 minutes under a dry nitrogen purge. Following the melting of the N66, 0.4 g of SE10 was added to the feed chamber and the initial composition was compounded 0.5 minutes under a dry nitrogen purge. Following the melting of the initial composition, 0.4 g of a PBT/SE10/X30 composite was added to the feed chamber and the final composition was compounded 1 minute under a dry nitrogen purge (the PBT/SE10/X30 composite was generated as described in Example 17). The mixing paddles were stopped, and the feed chamber was dismantled. The compounded Example 26 sample was removed from the chamber walls and paddles, and pressed onto a stainless steel plate, with the original stainless steel plate temperature of 23° C. The pressed Example 26 sample was measured for color using a HunterLab UltraScan XE colorimeter and the b* value recorded.

Table 7 given below contains colorimetric results for Examples 25-26, wherein PBT is employed as a polymeric carrier for the silver-based antimicrobial agent and a small amount of the organo-disulfide additive.

TABLE 7

| Example ID | Ag Salt | PBT composition | Additive | b* | % Change in b* |
|---|---|---|---|---|---|
| 25 (comparative) | 0.05% X30 | 94.9% PBT, 0.1% SE10, 5.0% X30 | None | 19.45 | — |
| 26 (inventive) | 0.05% X30 | 94.9% PBT, 0.1% SE10, 5.0% X30 | 0.1% SE10 | 8.25 | 58 |

Comparison of b* results shown above for Examples 25 and 26 indicates that superior b* results in melt-processed nylon 6,6 are achieved when an organo-disulfide additive of the invention is added and dispersed in the bulk of the polyamide prior to the addition of the silver-based antimicrobial agent and a minor amount of the organo-disulfide additive via the PBT polymeric carrier.

Examples 27-28

Examples 27-28 demonstrate an organo-disulfide additive of the invention in a 95/5 polymer blend of nylon 6,6 and nylon 6; wherein the nylon 6 is used as a polymeric carrier for the silver-based antimicrobial agent and an organo-disulfide additive of the invention.

Example 27

A Brabender paddle compounder was preheated to 295° C. and the mixing paddles were set to 60 rpm. Into the feed chamber was charged 38.0 grams of N66, and compounded 3 minutes under a dry nitrogen purge. Following the melting of the N66, 2.0 g of a nylon 6/XR composite was added to the feed chamber and the final composition was compounded 1 minute under a dry nitrogen purge (the nylon 6/XR composite was prepared as described in Example 3 except that the weight percent of XR was increased to 1%). The mixing paddles were stopped, and the feed chamber was dismantled. The compounded Example 27 sample was removed from the chamber walls and paddles, and pressed onto a stainless steel plate, with the original stainless steel plate temperature of 23° C. The pressed Example 27 sample was measured for color using a HunterLab UltraScan XE colorimeter and the b* value recorded.

Example 28

A Brabender paddle compounder was preheated to 295° C. and the mixing paddles were set to 60 rpm. Into the feed chamber was charged 38.0 grams of N66, and compounded 3 minutes under a dry nitrogen purge. Following the melting of the N66, 2.0 g of a nylon 6/SE10/XR composite was added to the feed chamber and the final composition was compounded 1 minute under a dry nitrogen purge (the nylon 6/SE10/XR composite was prepared as described in Example 8 except that the weight percent of XR was increased to 1% and the weight percent of SE10 was increased to 0.2%). The compounded Example 28 sample was removed from the chamber walls and paddles, and pressed onto a stainless steel plate, with the original stainless steel plate temperature of 23° C. The pressed Example 28 sample was measured for color using a HunterLab UltraScan XE colorimeter and the b* value recorded.

Table 8 given below contains colorimetric results for Examples 27-28, wherein nylon 6 is used as a polymeric carrier for the silver-based antimicrobial agent and an organo-disulfide additive of the invention.

TABLE 8

| Example ID | Ag Salt | Nylon 6 composition | b* | % Change in b* |
|---|---|---|---|---|
| 27 comparative | 0.05% XR | 99% Nylon 6, 1% XR | 23.28 | — |
| 28 inventive | 0.05% XR | 98.8% Nylon 6, 1% XR, 0.2% SE10 | 15.72 | 32.5 |

Comparison of b* results shown above for Examples 27 and 28 indicates that the presence of a small amount of an organo-disulfide (Hostanox SE10) compounded into nylon 6 is very effective in reducing the yellow discoloration of a melt-processed nylon 6,6/nylon 6 polymer blend composite containing silver sulfate.

The invention claimed is:

1. A polymer composite comprising a thermoplastic polyamide compounded with a silver-based antimicrobial agent and an organo-disulfide additive.
2. The composite of claim 1, wherein the thermoplastic polyamide comprises a nylon polymer.
3. The composite of claim 2, wherein the nylon polymer comprises nylon 6 or nylon 6,6.
4. The composite of claim 1, wherein the silver-based antimicrobial agent comprises silver sulfate.
5. The composite of claim 1, wherein the composite has a percent change in the 1976 CIE b* value at least 30% lower than the polyamide with the silver-based antimicrobial agent.
6. The composite of claim 1, wherein the composite comprises at least 0.01 weight % of silver sulfate based on polymer composite weight.
7. The composite of claim 1, wherein the silver-based antimicrobial agent is diphenyl disulfide or dioctadecyl disulfide.
8. A polymer composite comprising a thermoplastic polyamide compounded with a silver-sulfate antimicrobial agent in an amount of at least 0.01 weight % based on polymer composite weight, and an organo-disulfide additive,
   wherein the composite has a percent change in the 1976 CIE b* value at least 30% lower than the polyamide with the silver-sulfate antimicrobial agent.
9. A process of forming a polymer composite comprising a thermoplastic polyamide, a silver-based antimicrobial agent, and an organo-disulfide additive, wherein the composite has a percent change in the 1976 CIE b* value at least 30% lower than the polyamide with the silver-based antimicrobial agent, wherein the process comprises:
   heating the polyamide at least to melting point;
   obtaining the silver-based antimicrobial agent;
   obtaining the organo-disulfide additive; and
   a) compounding the silver-based antimicrobial agent and the organo-disulfide additive in a polymeric carrier to form a compounded mixture, wherein the organo-disulfide additive is added to the polymeric carrier before addition of the silver-based antimicrobial, then adding the compounded mixture to the heated polyamide, or
   b) compounding the heated polyamide with the organo-disulfide additive, then adding the silver-based antimicrobial agent,
   to form the polymer composite.
10. The process of claim 9, wherein the thermoplastic polyamide comprises a nylon polymer.
11. The process of claim 9, wherein the nylon polymer comprises nylon 6 or nylon 6,6.
12. The process of claim 9, wherein the silver-based antimicrobial agent comprises silver sulfate.
13. The process of claim 9, wherein the composite comprises at least 0.01 weight % of silver sulfate based on polymer composite weight.
14. The process of claim 9, wherein the organo-disulfide additive is diphenyl disulfide or dioctadecyl disulfide.

* * * * *